US012809877B1

(12) United States Patent
Risvik et al.

(10) Patent No.: US 12,809,877 B1
(45) Date of Patent: Nov. 24, 2026

(54) USING SINGLE VECTOR AND MULTI-VECTOR EMBEDDINGS TO PERFORM A SCALABLE SEARCH

(71) Applicant: Microsoft Technology Licensing, LLC, Redmond, WA (US)

(72) Inventors: Knut Magne Risvik, Trondheim (NO); Philip Bell Adams, Seattle, WA (US); Jingwen Lu, Carnation, WA (US); Nikhil Surendra Rao, Belmont, CA (US); Li Tan, Kirkland, WA (US); Andrija Antonijevic, Bellevue, WA (US); Xiaolong Huang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/263,329

(22) Filed: Jul. 8, 2025

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC ........................... G06F 16/24578; G06F 16/93
See application file for complete search history.

(56) References Cited

U.S. PATENT DOCUMENTS

2025/0190481 A1* 6/2025 Shrestha ............. G06F 16/3347
2025/0363101 A1* 11/2025 Jayaram .............. G06F 16/2438
2026/0099554 A1* 4/2026 Park ........................ G06F 16/93
2026/0148100 A1* 5/2026 Gao ........................ G06N 5/022

OTHER PUBLICATIONS

International Search Report and Written Opinion received for PCT Application No. PCT/US2026/029823 mailed Dec. 7, 2026, 16 Pages.

* cited by examiner

*Primary Examiner* — Etienne P Leroux
(74) *Attorney, Agent, or Firm* — Ray Quinney & Nebeker P.C.; James Bullough

(57) ABSTRACT

The present disclosure relates generally to systems and methods for executing a search query using a combination of single-vector searching and multi-vector comparing to more efficiently and accurately identify a set of documents that are responsive to the search query. This involves applying a vector generation model to a search query to generate both single-vector and multi-vector embeddings for the search query. A single-vector search is performed to determine a candidate set of documents that might be relevant to the search query. A more robust multi-vector comparison is then performed to generate a result set including a re-ranked set of documents and/or a further reduced set of documents that is responsive to the search query.

20 Claims, 7 Drawing Sheets

USING SINGLE VECTOR AND MULTI-VECTOR EMBEDDINGS TO PERFORM A SCALABLE SEARCH

BACKGROUND

In recent years, there have been significant advancements in systems and tools for searching large datasets. For example, search engines and other search platforms provide useful tools that support document retrieval. These tools leverage sophisticated indexing, natural language processing, and artificial intelligence (AI) to improve precision and recall across massive collections of documents. Many existing search systems, however, struggle in providing accurate results, particularly as datasets become prohibitively large. As discussed in further detail below, conventional search systems struggle in a number of ways in providing accurate and efficient results that are responsive to search queries.

DETAILED DESCRIPTION

Figure 1:
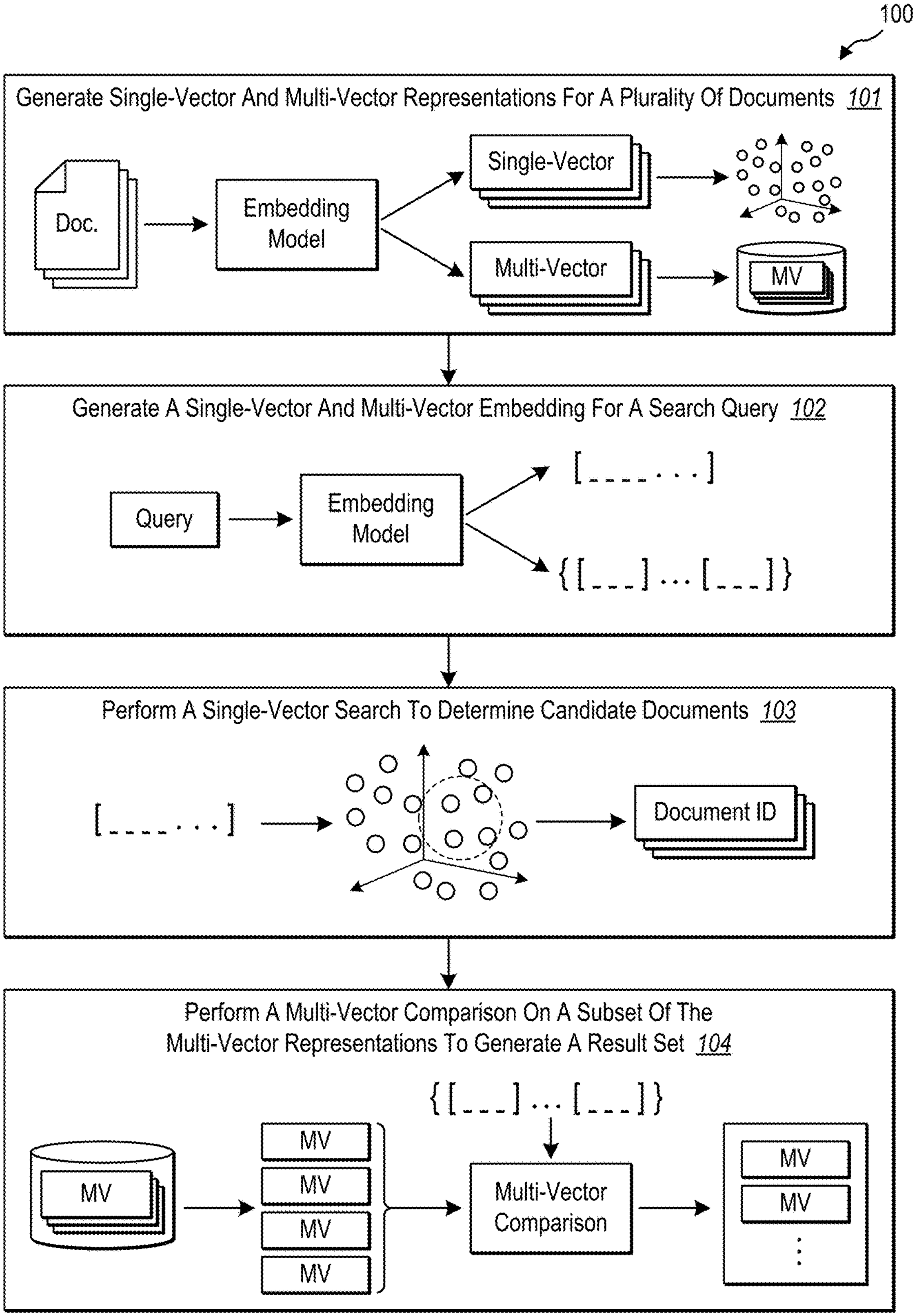
FIG. 1 illustrates an example overview of a single and multi-vector search system that leverages both single-vector and multi-vector embeddings to accurately and efficiently generate a result set responsive to a search query.

The present disclosure relates to systems, methods, and computer-readable media for performing a search on a plurality of documents using both single vector embeddings and multi-vector embeddings representative of a large collection of documents (e.g., billions of documents). Indeed, as will be discussed herein, in response to a received search query, a low-cost single-vector search may be performed to identify a set of candidate documents representing a subset of the large collection of documents. A multi-vector comparison may then be performed against a set of multi-vector embeddings representative of the set of candidate documents to accurately determine which of the candidate documents are responsive to the received search query. This combination of single and multi-vector search yields accurate search results using a fraction of the computational resources that are typically used when performing more complex conventional searches.

As an illustrative example, systems (and/or methods and computer readable media) described herein involve receiving a search query associated with identifying one or more documents from a plurality of documents. In one or more embodiments, systems described herein apply a vector generation model to the search query to generate both a single vector query embedding and a multi-vector query embedding representative of the search query. In performing an initial single vector search, the systems may identify a document graph index including single-vector embeddings representative of the plurality of documents and including values that are mapped to locations in an n-dimensional space. The systems may identify a set of candidate documents (e.g., a subset of the plurality of documents) based on single-vector embeddings of those candidate documents sharing a proximity within the n-dimensional space with the single-vector query embedding.

After the candidate documents are identified, systems described herein may further fetch a set of multi-vector embeddings associated with the identified candidate documents. Once obtained, the systems can perform a multi-vector comparison by determining a metric of multi-vector similarity between the multi-vector query embeddings and the multi-vector embeddings associated with the candidate documents. In one or more embodiments described herein, the system generates a result set including a re-ranking of the candidate documents and/or a further narrowed set of candidate documents that are determined to be responsive to the received search query.

The present disclosure describes a number of practical applications that provide benefits and/or solve problems associated with searching large collection(s) of documents based on a search query. By way of example and not limitation, some of these benefits will be discussed in further detail below in connection with a single and multi-vector search system.

For example, by using a single-vector search in accordance with one or more embodiments, the single and multi-vector search system narrows down a collection of documents to a much smaller set of candidate documents using an inexpensive search technique. Indeed, while single vector searches may not yield as accurate of results as more complex search techniques, single vector searches are nevertheless effective at identifying those results that are not relevant or which are clearly not responsive to a search query. As such, the single vector search provides an effective way to narrow down a potential set of search results to a fraction (e.g., less than 1%) of a collection of documents.

By narrowing down the search to a set of candidate documents, the single and multi-vector search system provides a significantly reduced set of documents on which a more complex multi-vector search can be performed. In this way, the single and multi-vector search system provides access to a more accurate search tool, while reducing use of computational resources that would otherwise be involved in performing a robust search of a full collection of documents including billions of documents or other content items.

As will be discussed below, the single and multi-vector search system uses a common type of embedding model (referred to in some implementations as a vector generation model) to generate embeddings for both the collection of documents and the search query. By using a common model in generating embeddings for both objects, the single and multi-vector search system ensures that relevant parameters and features are being used in generating embeddings for both the search query and the documents that are being searched. This ensures that the single vector query embedding is mapped to a location in an n-dimensional space that is proximate to relevant document results within the same n-dimensional space. This also ensures or otherwise improves the chances that the multi-vector comparison yields accurate results.

In addition to using the same model to generate embeddings for the query and documents, the same model is used to jointly inference both the single vector embeddings and the multi-vector embeddings. Indeed, as will be discussed below, the embedding model (or vector generation model) may calculate individual tokens representative of features or characteristics of the documents (or query), which can be combined in determining single-vector values. These individual tokens that are used in generating the single-vector values may then be leveraged to determine the specific values of the multi-vector embeddings, resulting in significant computational savings in the process of generating the embeddings that are used in carrying out the single-vector searches and multi-vector comparisons. This process also yields significant savings in updating embeddings for a collection of documents as additional documents are added over time.

In one or more embodiments, the single and multi-vector search system further improves efficiency in carrying out the searches described herein by parallelizing portions of the search process. In particular, in one or more embodiments, the single and multi-vector search system partitions a document graph index into multiple shards and performs a plurality of single-vector searches on the respective shards to determine subsets of candidate documents from the respective shards. This provides a fast and scalable parallel approach to analyzing a massive collection of documents. This can be particularly beneficial on a distributed computing system, such as a cloud computing system, where large quantities of computing resources can be deployed for particular tasks, such as performing one or more query searches as described herein.

As illustrated in the foregoing discussion, the present disclosure utilizes a variety of terms to described features and advantages of one or more embodiments of a single and multi-vector search system described herein. Additional detail will now be provided regarding the meaning of some of these terms.

In one or more examples described herein, a search is described in connection with searching a plurality or collection of documents. As discussed herein, a document may include any unit or object that includes digital content or which conveys information in a variety of formats, structures, or media. Documents may refer to text-based documents, image-based documents, spreadsheets, emails, web pages, social media entries, or even structured data files, such as JSON or XML files. Documents may further include embedded content, such as metadata, annotations, or other information that may be represented within an embedding, such as a single-vector or multi-vector embedding).

One or more embodiments described herein involve representations of documents and/or search queries using embeddings or other representations. As discussed herein, an embedding may include a digital representation of a document in the form of one or more vectors. For example, a single-vector embedding may refer to a representation of a document, which includes a single vector having values that can be mapped to a multi-dimensional space. As another example, a multi-vector embedding may refer to a representation of a document, which includes multiple vectors that similarly have values that can be mapped to a multi-dimensional space. As will be discussed below, these vectors can be compared to one another to determine measures of similarity between embeddings which correlate to similarities between queries and/or documents.

In one or more embodiments, the embeddings are generated using an embedding model or a vector generation model. As used herein, an embedding model or vector generation model may refer to any model or algorithm that is used to generate embeddings based on corresponding data objects. In one or more embodiments, an embedding model is used to generate both single and multi-vector embeddings representative of documents. The embedding model is also used to generate single and multi-vector embeddings for a search query.

A client or client device may refer to any type of electronic device or client application capable of sending and receiving data over a network. In one or more embodiments, the client or client device refers specifically to a mobile device such as a mobile telephone, a smart phone, a personal digital assistant (PDA), a tablet, a laptop, or a wearable computing device. In one or more embodiments described herein, a client or client device refers to a mobile device having a touch screen interface whereupon selectable icons can be presented and selected by a user of the client device. Indeed, as will be discussed in connection with one or more embodiments described herein, a client or client device may provide an interface through which a user may provide a search query (e.g., a user-composed query or a query generated through the use of generative AI), which is utilized by the single and multi-vector search system to carry out a search using both single and multi-vector embeddings. The single and multi-vector search system may be executed on the client device or on a server device, such as a server node on a cloud computing system. Additional detail in connection with an example computing device that may refer to an example client or client device is discussed below in connection with FIG. 7.

Additional details regarding example implementations of the single and multi-vector search system will now be discussed in connection with one or more example implementations shown in the figures. For example, FIG. 1 illustrates an example overview of a single and multi-vector search system that performs both single and multi-vector embeddings to efficiently and accurately determine a result set that is responsive to a search query. While FIG. 1 provides an overview implementation in accordance with one or more embodiments, additional details will be discussed in connection with subsequent figures.

As shown in FIG. 1, a single and multi-vector search system performs an act 101 of generating single vector and multi-vector representations for a plurality of documents. As will be discussed below, this involves applying an embedding model to a plurality of documents to generate both single-vector and multi-vector embeddings that are representative of the documents from the collection of documents. In one or more embodiments, the single-vector embeddings are represented within a document graph index. In one or more embodiments, the multi-vector embeddings are maintained in a supplemental storage.

As further shown in FIG. 1, the single and multi-vector search system performs an act 102 of generating a single vector and multi-vector embedding for a search query. This act of generative the embeddings for the search query may involve a similar process as generating the single and multi-vector embeddings for the documents. Indeed, in one or more embodiments, the single and multi-vector search system applies the same embedding model to the search query as used in generating the embeddings for the plurality of documents.

As further shown in FIG. 1, the single and multi-vector search system performs an act 103 of performing a single vector search to determine candidate documents. This search may be performed using any number of algorithms. In one or more embodiments, the single and multi-vector search system performs a nearest neighbor search to determine a set of single-vector embeddings associated with the candidate set of documents that are within a proximity of a location of the single-vector query embedding when mapped to an n-dimensional space. As shown in FIG. 1, the single and multi-vector search system may identify any number of document identifiers for the candidate documents.

As further shown in FIG. 1, the single and multi-vector search system performs an act 104 of performing a multi-vector comparison on a subset of the multi-vector representations to generate a result set. The single and multi-vector search system performs the multi-vector comparison on those multi-vector embeddings that correspond to the document IDs of the candidate documents. As shown in FIG. 1, the multi-vector embeddings may be retrieved from a storage (e.g., a secondary storage), and a multi-vector comparison is carried out to determine the result set that is responsive to the search query. Additional detail in connection with performing the multi-vector comparison and generating the result set will be discussed in further detail below.

As noted above, FIG. 1 illustrates an environment 200 including a computing device 202 in communication with a server device(s) 204 having a single and multi-vector search system 208 implemented thereon. The computing device 202 may refer to a physical client device, such as a laptop, mobile device, or other electronic device. Alternatively, the client device 202 may refer to a remote device, such as a server or computing device that is hosted on a cloud computing system. Similarly, the server device(s) 204 may refer to a server node or other computing device, such as a server device hosted by a cloud computing system. In one or more embodiments, the computing device 202 and server device(s) 204 are hosted on a common system (e.g., a cloud computing system).

Figure 2:
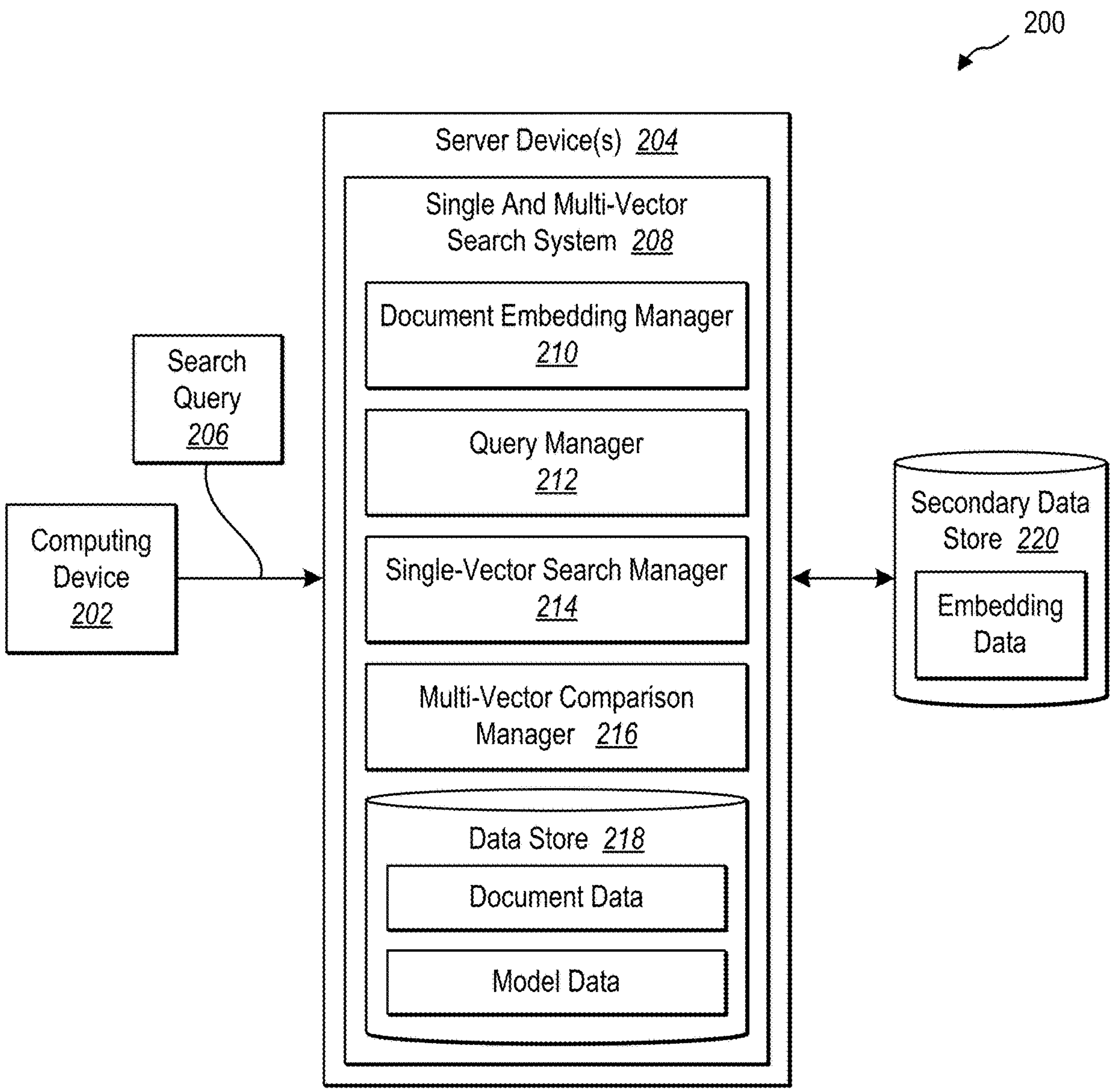
FIG. 2 illustrates an example environment in which a single and multi-vector search system in accordance with one or more embodiments.

As shown in FIG. 2, the computing device 202 may provide a search query 206 to the server device 204 for processing by the single and multi-vector search system 208. In one or more embodiments, the search query 206 is communicated over a network, which may refer to any data link that enables transport of electronic data between respective devices within the environment 200. In addition, while one or more embodiments described herein refer to a computing device 202, such as an end-user device or client device that transmits the search query 206 to the server device(s) 204, it will be appreciated that a variety of entities may generate and provide the search query 206 to be used in identifying one or more documents that are responsive to the search query 206. For instance, in addition or as an alternative to receiving the search query 206 from the computing device 202, the search query 206 may refer to an output of a large language model (LLM) or other type of generative AI model. In one or more embodiments, the search query 206 refers to a request for one or more documents generated by an application running on the computing device 202 (or that is being accessed remotely via the computing device 202). In one or more embodiments, the computing device 202 refers to an internal client of a cloud computing system that communicates directly with the single and multi-vector search system 208 via an internal network of the cloud computing system.

As noted above, the server device(s) 204 has a single and multi-vector search system 208 implemented thereon. As shown in FIG. 2, the single and multi-vector search system 208 includes a document embedding manager 210, a query manager 212, a single vector search manager 214, and a multi-vector comparison manager 216. As further shown, the single and multi-vector search system 208 includes a data storage 218 including various types of data stored thereon. In one or more embodiments, the single and multi-vector search system 208 communicates with a secondary data store 220 to obtain embedding data stored thereon. Additional detail in connection with these components 210-220 will be discussed in further detail below.

It will be appreciated that while each of the components 210-218 of the single and multi-vector search system 208 are shown as implemented on a single server device 204, it will be appreciated that the various components 210-218 of the single and multi-vector search system 208 may be implemented on the same or across different computing devices (e.g., on different servers of a cloud computing system). While features of the single and multi-vector search system 208 are described in connection with discrete components 210-218, it will be appreciated that this description is provided by way of example, and that specific features and functionality, even of the same component, may be implemented across different devices or by other components described herein. Some examples of these variations will be discussed below.

As noted above, the single and multi-vector search system 208 includes a document embedding manager 210. In one or more embodiments, the document embedding manager 210 generates embeddings for a plurality of documents. In particular, the document embedding manager 210 generates both single vector embeddings and multi-vector embeddings that represent corresponding documents from the plurality of documents. In one or more embodiments, the document embedding manager 210 generates a pair of embeddings (a single vector and multi-vector pair) for each document from a collection of documents.

As noted above, the collection of documents may refer to a very large corpus of documents, with some examples referring to 10-40 billion documents. Other implementations may include a greater number of documents. With this large number of documents, the document embedding manager 210 may generate the embeddings using in an offline process. In addition, the document embedding manager 210 may continually generate new single-vector and multi-vector embedding pairs as additional documents are added to the corpus of searchable documents.

As noted above, the document embedding manager 210 generates single-vector embeddings. This can be performed using an embedding model (or vector generation model). In one or more embodiments, the model evaluates and identifies any number of features or characteristics of a document and calculates or otherwise determines vales associated with the features or characteristics of the content within the document(s). In one or more embodiments, this involves generating feature tokens representative of the characteristics or features. The document embedding manager 210 may combine these tokens and feature values within a single vector.

In one or more embodiments, the document embedding manager 210 generates a graph index including each of the single-vector embeddings represented therein. In one or more embodiments, the graph index includes a representation of an n-dimensional space with each of the single-vectors being mapped to a corresponding location within the n-dimensional space. In one or more embodiments, the graph index includes a vector representation therein for each document from the plurality of documents that is being searched, such that there is a 1:1 correspondence between each document from a collection of documents and the single-vector embeddings. As will be discussed below, this graph index may be used in performing a single-vector search to identify select embeddings represented within the graph index to be included within a set of candidate documents.

In addition to generating the single-vector embeddings and the graph index, the document embedding manager 210 may additionally generate multi-vector embeddings. In particular, the document embedding manager 210 may use the same embedding model as used in generating the single-vector embeddings to generate multi-vector embeddings representative of the same plurality of documents as the single-vector embeddings. In contrast to the single-vector embeddings, each of the multi-vector embeddings can include multiple vector to represent the various characteristics or features of the documents. In one or more embodiments, the multi-vector embeddings provide additional detail about the respective characteristics and features of the documents (relative to the corresponding single-vector embeddings).

As noted above, the multi-vector embedding is generated using the same embedding generator as used in generating the single-vector embeddings. In one or more embodiments, the document embedding manager 210 utilizes the values that are determined in generating the respective single-vector values to similarly generate the multi-vector values (e.g., at the same time as, before, or after generating and compiling the single-vector values). For example, in one or more embodiments, the document embedding manager 210 generates classification tokens representative of one or more features of the document. Where generating the single-vector embedding may involve combining values of various tokens to determine values of the single-vector embedding, the document embedding manager 210 may use those individual tokens or discrete values to generate the values of the multiple vectors within the multi-vector embeddings. As such, the document embedding manager 210 is able to leverage the computing resources expended in generating the single-vector embeddings to jointly or concurrently generate (e.g., jointly inferenced) the multi-vector embeddings. This provides an efficient re-use of computational resources, both in the generation of the embeddings for the documents, as well as generating embedding pairs for incoming search queries.

The embedding pairs may be stored on any of a variety of locations. In one or more embodiments, the graph index is stored locally, on a secondary data store 220, or may alternatively be provided to the computing device 202. The graph index provides a lightweight representation of all the documents that may be fully or partially maintained on a greater variety of computing devices. The multi-vector embeddings may require additional storage space and, as such, may be maintained on a supplemental storage (e.g., the secondary data store 220).

In one or more embodiments, the embeddings are stored according to document identifiers (IDs). For example, in one or more embodiments, the document may be stored at a location that is locatable using a key-value store in which the document(s) are cataloged by the document ID. Similarly, the single-vector embeddings may be associated document IDs that are similarly indexed or otherwise mapped to the corresponding document. Similarly, the multi-vector embeddings may be associated with the same set of document IDs. As will be discussed below, the document IDs may be used in fetching multi-vector embeddings after performing a single-vector search.

As noted above, and as further shown in FIG. 2, the single and multi-vector search system includes a query manager 212. The query manager 212 may provide any functionality related to receiving and processing a search query 206. For example, in one or more embodiments, the query manager 212 provides an interface (e.g., a user interface) that is presented to a user of the computing device 202. This query interface enables an entity (e.g., the user of the computing device 202) to generate a query or other input that may be used in performing a search of the plurality of documents.

Upon receiving the search query 206, the query manager 212 may generate an embedding pair representative of the search query 206. Similar to the document embedding manager 210, the query manager 212 may generate both a single-vector and multi-vector query representative of the search query 206 using the same embedding model as used in generating the document embeddings. By using the same embedding model, the query manager 212 ensures that the similar features and characteristics are being considered in generating the values of the embeddings as the features and characteristics that are considered in generating the embedding pairs for the documents. This increases the likelihood that any result set generated based on the query embedding will yield accurate results when searched against a similarly generated index or collection of embeddings.

As noted above, the search query 206 may be received in a variety of forms. For example, in one or more embodiments, the search query 206 is a natural language query as generated by a user of the computing device 202. In one or more embodiments, the search query 206 may begin as a natural language query, but be converted to a more structured or rule-based search query 206 by an LLM or other model that is trained to convert natural language to a search query 206 having a particular format or configuration. In either scenario, the query manager 212 may generate a pair of embeddings representative of the search query 206, which may be used in performing searches, as discussed below.

As shown in FIG. 2, the single and multi-vector search system 208 additionally include a single vector search manager 214. The single vector search manager 214 may facilitate any functionality related to performing a single-vector search against a collection of single-vector embeddings based on a single-vector representation of the search query 206. In one or more embodiments, the single vector search manager 214 performs a single-vector search to determine a set of candidate documents from a plurality of documents where the set of candidate documents is associated with a subset of single-vector embeddings that are determined to fall within a proximity of the search query embedding when mapped to a location within an n-dimensional space of the document graph index. Performing the single-vector search may be performed in a variety of ways. Additional detail in connection with performing the single-vector search will be discussed below.

As shown in FIG. 2, the single and multi-vector search system 208 additionally includes a multi-vector comparison manager 216. The multi-vector comparison manager 216 may facilitate any functionality related to performing a multi-vector comparison against a set of multi-vector embeddings to determine one or more metrics of similarity between a multi-vector query embedding and a set of multi-vector embeddings corresponding to a set of identified candidate documents.

As will be discussed in further detail below, the multi-vector comparison manager 216 may perform a multi-vector comparison against a selective subset of multi-vector embeddings associated with a set of candidate documents. For example, in response to identifying a subset of single-vector embeddings based on the single-vector search, the multi-vector comparison manager 216 may identify a subset of a collection of multi-vector embeddings on which to perform a multi-vector comparison. In this way, the multi-vector comparison manager 216 selectively analyzes only the subset of multi-vector embeddings to determine which of the subset of candidate documents are most relevant to a received search query 206. Additional detail in connection with performing a multi-vector comparison and generating a result set that is responsive to the search query 206 will be discussed below.

As shown in FIG. 2, the single and multi-vector search system 208 includes a data store 218. The data store 218 may maintain a variety of data that can be accessed by the different components 210-216 of the single and multi-vector search system 208. For example, the data store 218 may include document data. This document data may include any information associated with the documents for which embedding pairs have been created and/or that are being searched responsive to the search query 206. The document data may include content of the documents, document identifiers, the embedding data, locations of the documents and/or embeddings, or any other information associated with the documents that may be used by the components 210-216 to perform any of the features and functionality described herein.

As further in FIG. 2, the data store 218 additionally includes model data. The model data may include any information or data associated with an embedding model (or vector generation model), search model(s), or any other models that are used by the components of the single and multi-vector search system 208. While not shown in FIG. 2, the model data may be located on the server device(s) 204, or may be distributed across any number of devices (e.g., on the computing device 202 or multiple server devices 204).

As noted above, and as shown in FIG. 2, the environment 200 further includes a secondary data store 220. This secondary data store 220 includes embedding data. The embedding data may include any information associated with the embedding pairs that are generated based on the plurality of documents and/or received search query 206. In one or more embodiments, the embedding data includes a separate storage for the single-vector embeddings and for the multi-vector embeddings. As noted above, data for the single-vector embeddings may be maintained within a document graph index that can be distributed to other devices (e.g., the computing device 202). Alternatively, the data for the multi-vector embeddings may be maintained in a more robust storage space or on a key-value store from which multi-vector embeddings are selectively accessed based on their associated document identifiers. For instance, where a single-vector search indicates a subset of multi-vector embeddings, the single and multi-vector search system 208 may selectively fetch only the subset of multi-vector embeddings from the secondary data store 220 on which to perform a multi-vector comparison.

Figure 3:
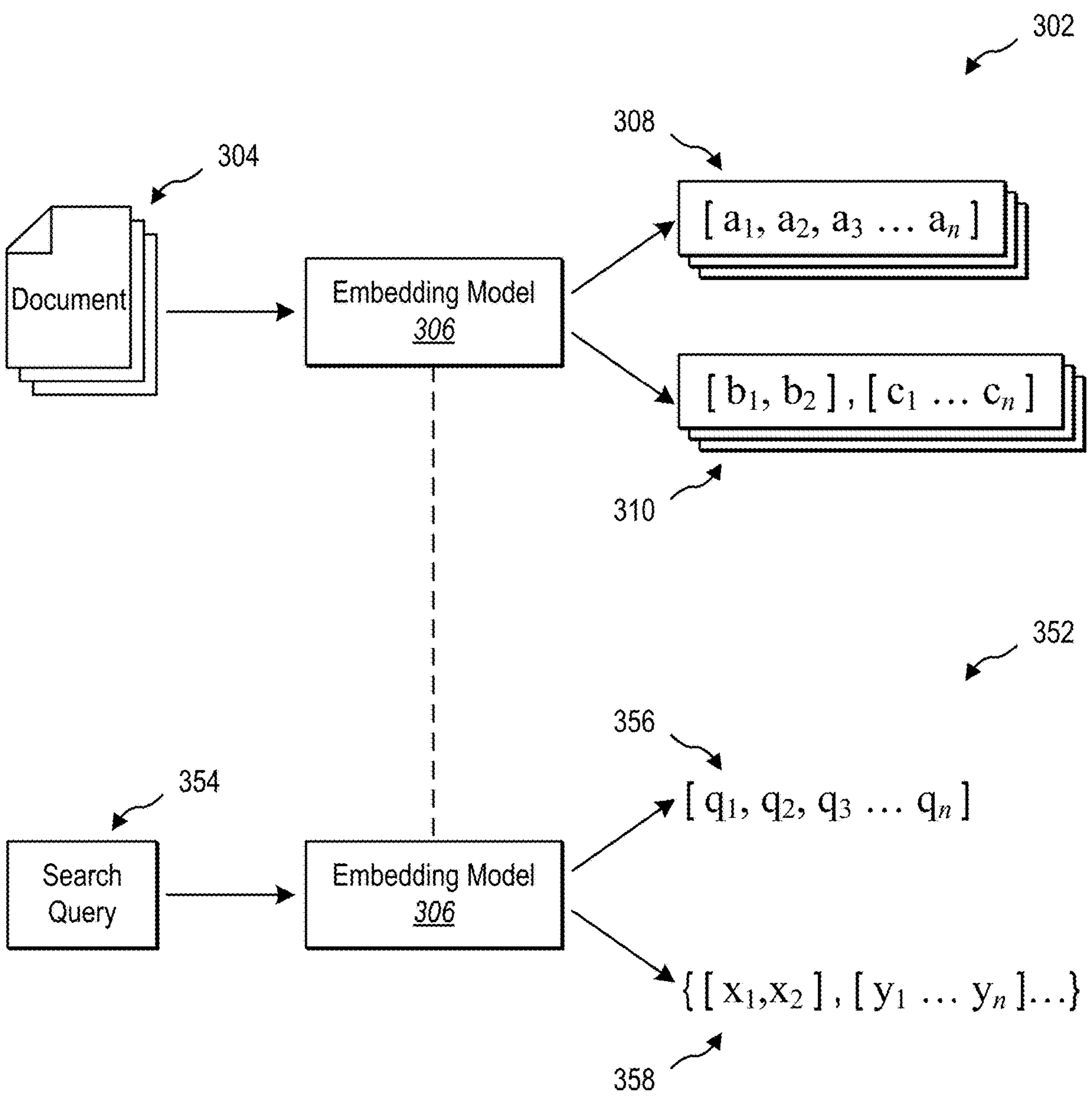
FIG. 3 illustrates an example application of an embedding model to a plurality of documents and a search query to generate corresponding single and multi-vector embeddings in accordance with one or more embodiments.

FIG. 3 illustrates an example set of workflows showing generation of embedding pairs for different objects described herein. For example, FIG. 3 illustrates a first workflow 302 showing generation of first embeddings for a plurality of documents 304 in accordance with one or more embodiments described herein. In addition, FIG. 3 illustrates a second workflow 352 showing generation of a pair of embeddings for a search query 354 in accordance with one or more embodiments described herein.

As shown in the first workflow 302, the single and multi-vector search system 208 may apply an embedding model 306 to a plurality of documents 304 to generate both a plurality of single-vector embeddings 308 and a plurality of multi-vector embeddings 310. In one or more embodiments, the single and multi-vector search system 208 jointly inferences or otherwise generates the responsive collections of vector embeddings 308-310 using the same embedding model 306.

Using the same embedding model 306 to generate both the single-vector embeddings 308 and the multi-vector embeddings 310 yields a number of benefits. For example, by using the same embedding model 306, the single and multi-vector search system 208 ensures that a similar (e.g., same or nearly identical) set of features and characteristics are considered in generating both the single and multi-vector representations. This creates a similarity between the two sets of embeddings 308 such that a single-vector search that is performed using the first set of embeddings 308 yields a set of candidate embeddings that are relevant to the second set of embeddings 310. In this manner, the single and multi-vector search system 208 can perform a multi-vector comparison on the second set of embeddings 310 and confidently determine that a result set is an accurate ranking or identified set of documents.

As shown in FIG. 3, the first plurality of embeddings includes a plurality of single-vector embeddings 308 representative of the collection of documents 304. Each of the single-vector embeddings 308 include individual vectors (e.g., $[a_1, a_2, a_3 \ldots a_n]$) in which each of the values of the single-vector embeddings represent features or characteristics of the corresponding documents. Each of the single-vector embeddings 308 may include 100s or 1000s of values. In one or more embodiments, the values of the single-vector embeddings 308 are based on a combination of values. For example, in one or more embodiments, the single and multi-vector search system 208 determines feature tokens associated with a document, and combines multiple tokens to determine an individual value of the single-vector embedding. Thus, where a single-vector embedding may include 100s or 1000s of values, more features or characteristics may have been considered in determining the specific sets of values.

As shown in FIG. 3, the second plurality of embeddings includes a plurality of multi-vector embeddings 310 representative of the collection of documents 304. Each of the multi-vector embeddings 310 include sets of vectors including any number of individual values (e.g., $[b_1, b_2]$, $[c_1, \ldots c_n]$ . . . ). The individual vectors within the multi-vector embeddings 310 may have different vector lengths. Similar to the single-vector embeddings, the individual values within the multi-vector embeddings 310 may be based on different features or characteristics of the documents 304.

As noted above, using the same embedding model 306 to generate both the single-vector embeddings 308 and the multi-vector embeddings 310 yields various benefits. Another benefit in connection with the pair of embeddings 308, 310 involves leveraging the values considered in determining the individual values of the single-vector embeddings 308 in determining the values of the multi-vector embeddings 310. For example, where multiple values may be considered and combined into the single-vector values, the single and multi-vector search system 208 may represent these multiple values within the multiple vectors of the multi-vector embeddings 310. This provides additional accuracy in representing the documents 304 while also re-using the processing resources used in generating the single-vector embeddings 308. Indeed, in one or more embodiments, the single and multi-vector search system 208 generates the multi-vector embeddings 310 using negligible additional computing resources beyond the resources used when generating the single-vector embeddings 308.

As mentioned above, and as shown in FIG. 3, the single and multi-vector search system 208 may additionally perform a second workflow 352 in which a pair of embeddings are generated for a received search query 354. As shown in FIG. 3, the single and multi-vector search system 208 may utilize the same embedding model 306 as used by the single and multi-vector search system 208 in generating the first and second sets of embeddings 308-310 representative of the plurality of documents 304.

For example, the single and multi-vector search system 208 may apply the embedding model 306 to the search query 354 to generate a single-vector query embedding 356. As shown in FIG. 3, the single-vector query embedding 356 includes any number of individual values (e.g., $[q_1, q_2, q_3, \ldots q_n]$). In one or more embodiments, the single-vector query embedding 356 has a similar length as the length of the single-vector embeddings 308 generated based on the documents 304. It will be appreciated that the single and multi-vector search system 208 may apply the embedding model 306 to the search query 354 in much the same as the embedding model 306 is applied to the documents 304 when generating the single-vector embeddings 308. Thus, the resulting single-vector query embedding 356 includes a set of vector values that can be mapped to a similar n-dimensional space as the single-vector embeddings 308 of the documents 304.

As further shown, the single and multi-vector search system 208 may apply the embedding model 306 to the search query 354 to generate a multi-vector query embedding 358. As shown in FIG. 3, the multi-vector query embedding 358 includes any number of vectors having sets of respective vector values (e.g., $[x_1, x_2]$, $[y_1 \ldots y_n] \ldots$). The multi-vector embedding 358 may have multiple vectors of variable length, which may be similar or different from the vectors of the multi-vector embeddings 310 based on the documents 304. It will be appreciated that the single and multi-vector search system 208 may generate the multi-vector query embedding 358 using a similar process as used when generating the multi-vector embeddings 310 representative of the documents 304.

Additional detail will now be discussed in connection with a workflow for sequentially performing both a single-vector search and multi-vector comparison of respective sets of embeddings based on a received query. In particular, FIG. 4 illustrates a workflow 400 depicting an example process in which a single-vector search and multi-vector comparison are sequentially performed to determine a result set that is responsive to the search query.

Figure 4:
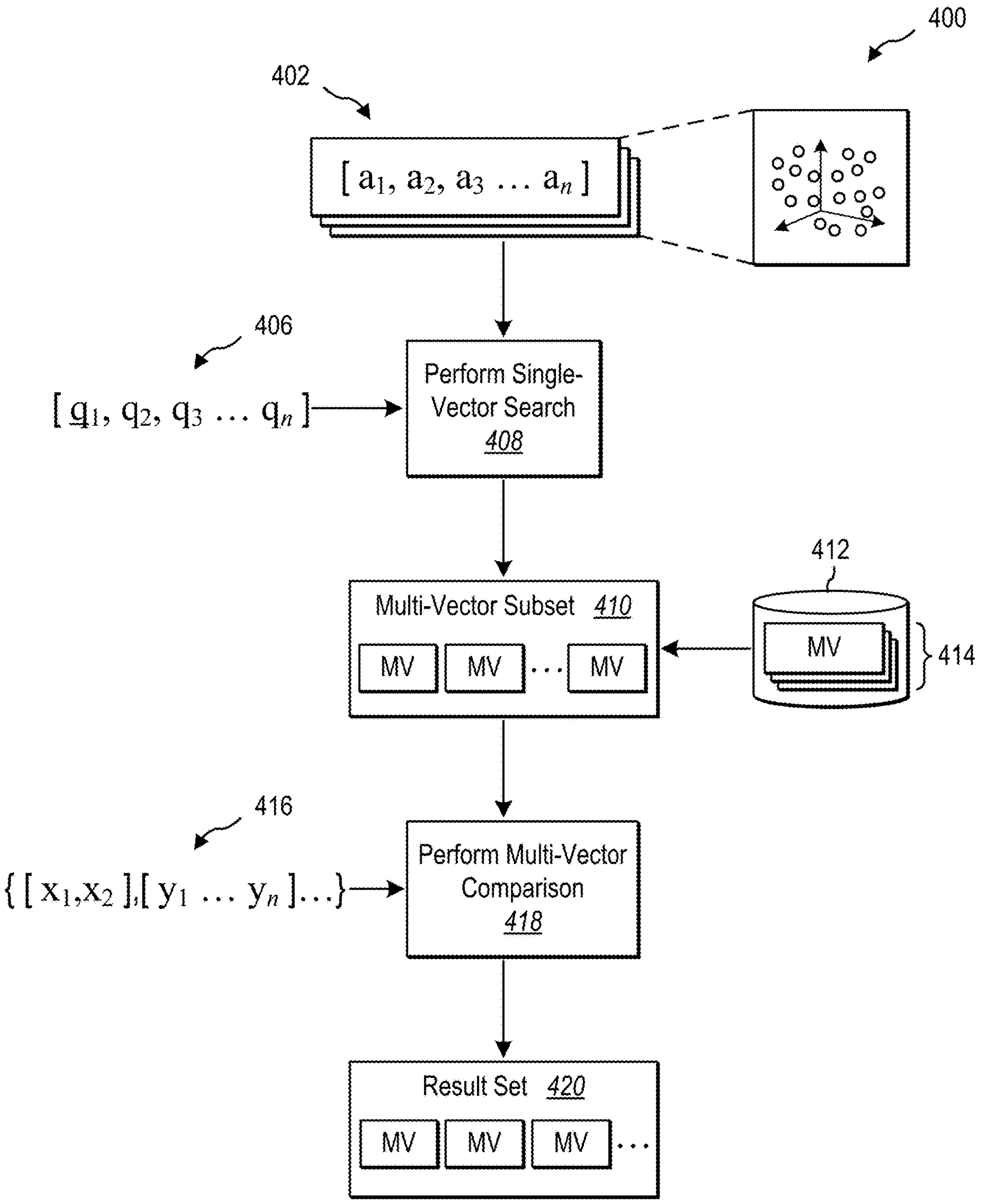
FIG. 4 illustrates an example workflow showing an implementation in which a single and multi-vector search system is used to generate a result set in accordance with one or more embodiments.

As shown in FIG. 4, single and multi-vector search system 208 may obtain, generate, or otherwise identify a set of single-vector embeddings 402 that are representative of a plurality of documents. The set of single-vector embeddings 402 may be generated using a similar process discussed above in connection with FIG. 3. As shown in FIG. 4, the single and multi-vector search system 208 may additionally obtain or identify a document graph index 404 including an n-dimensional representation of all of the single-vector embeddings within the set of single-vector embeddings 402. It will be noted that this illustration shows an example 3-dimensional graph for illustration purposes only. It will be appreciated that the document graph index 404 may include any number of dimensions, likely 100*s* or thousands of dimensions that are not as easily represented visually.

As noted above, the single and multi-vector search system 208 may receive and/or generate embeddings based on a search query. As shown in FIG. 4, the single and multi-vector search system 208 may receive or otherwise identify a single-vector query embedding 406 based on a received search query.

Upon receiving the single-vector query embedding 406, the single and multi-vector search system 208 may perform an act 408 of performing a single-vector search. As indicated in one or more examples above, the single and multi-vector search system 208 performs a single-vector search on the single-vector embeddings 402 based on the single-vector query embedding 406 to determine a set of candidate documents from a large plurality of documents that are predicted to be more relevant or responsive to the received search query.

This single-vector search may be done in a variety of ways. In one or more embodiments, the single and multi-vector search system 208 performs a nearest neighbor search on the document graph index 404 by mapping an n-dimensional representation of the single-vector query embedding 306 to a location within the document graph index 404. In this way, the single and multi-vector search system 208 may identify a subset of single-vector embeddings from the set of single-vector embeddings 402 that most closely resemble the single-vector query embedding 406 of the search query. More specifically, using the nearest neighbor search, the single and multi-vector search system 208 identifies those single-vector embeddings that are within a neighborhood of the single-vector query embedding 406 and determines which documents of a plurality of documents to be included within a set of candidate documents.

Other types of single-vector searches may also be used. For example, the single and multi-vector search system 208 may identify a cluster of embeddings within a predetermined location or distance from the location of the single-vector query embedding 406. In one or more embodiments, the single and multi-vector search system 208 may simply identify those single-vector queries that are within a threshold Euclidean distance, or identify the nearest predetermined number of single-vector embeddings (e.g., 10,000, 100,000 embeddings) to include within a set of candidate documents.

In addition to narrowing the plurality of documents to a candidate set using a variety of single-vector search approaches, the single and multi-vector search system 208 may also narrow the documents at variable levels of aggressiveness. For example, the single and multi-vector search system 208 may reduce the number of documents to a candidate set that is less than 1% of the total number of documents included within the larger collection of documents. In one or more embodiments, the single and multi-vector search system 208 reduces the number of documents to a set number or a set percentage. For example, in one or more embodiments, the set of candidate documents may include 10,000 or 100,000 documents which is significantly less than 1% of a larger collection of documents, which include billions of documents.

As noted above, in identifying the subset of single-vector embeddings that are similar to the single-vector query embedding 406, the single and multi-vector search system 208 may identify a set of document identifiers associated with corresponding candidate documents. In one or more embodiments, the single and multi-vector search system 208 may use these document identifiers to perform additional acts of the workflow 400.

For example, as shown in FIG. 4, the single and multi-vector search system 208 identifies a multi-vector subset 410 based on document identifiers for the identified subset of candidate documents (e.g., based on the subset of single-vector embeddings determined from the single-vector search). In one or more embodiments, the single and multi-vector search system 208 obtains the multi-vector subset 410 from a secondary data store 412 having a plurality of multi-vector embeddings maintained thereon. In one or more embodiments, the secondary data store 412 is a key-value store on which all of the multi-vector embeddings 414 representative of the collection of documents is maintained. Rather than retrieving all of the multi-vector embeddings 414, however, the single and multi-vector search system 208 selectively retrieves only a multi-vector subset 410 inclusive of those multi-vector embeddings that correspond to the obtained document identifiers.

As shown in FIG. 4, the single and multi-vector search system 208 may receive, generate, or otherwise obtain the multi-vector query embedding 416. Upon receiving the multi-vector query embedding 416, the single and multi-vector search system 208 may perform an act 418 of performing a multi-vector comparison 418. More specifically, the single and multi-vector search system 208 may perform a comparison on the multi-vector subset 410 associated with the identified set of candidate documents based on the multi-vector query embedding 416.

In one or more embodiments, performing the multi-vector search involves determining a multi-vector similarity between the multi-vector query embedding 416 and the embeddings from the multi-vector subset 410. At a general level, in one or more embodiments, determining the multi-vector similarity is based on a determined similarity between a combination of values from the multi-vector query embedding and combinations of values from the multi-vector embeddings from the multi-vector subset 410.

More specifically, the multi-vector comparison may be performed using a variety of approaches and algorithms. In one or more embodiments, the metric of similarity between the multi-vector query embedding and respective embeddings from the multi-vector subset 410 is determined based on a metric of Shamford distance. In this example, the similarity metric may be determined based on relative distances between certain features rather than absolute distances. Other examples for determining metrics of similarity may include comparing matrix representations of the multi-vector embeddings, aggregating values of multiple vectors, average pooling, max pooling, Earth Mover's distance, or other techniques that may be used in determining metrics of similarity between multi-vector representations.

As shown in FIG. 4, upon performing the multi-vector comparison and determining metrics of similarity between the multi-vector query embedding 416 and the embeddings of the multi-vector subset 410, the single and multi-vector search system 208 may generate a result set 420. In one or more embodiments, the result set includes a re-ranking of the multi-vector subset 410 based on the metric of similarity between the multi-vector query embedding 416 and the multi-vector embeddings of the multi-vector subset 410. In one or more embodiments, the single and multi-vector search system 208 further narrows the candidate set by determining a subset of multi-vector embeddings from the multi-vector subset 410 representative of the most responsive or relevant documents to the search query.

In one or more embodiments, the single and multi-vector search system 208 additionally performs a partitioning step in which the documents are sub-divided into partitions that are analyzed and searched separately. For example, FIG. 5 illustrates an example workflow 500 in which the single and multi-vector search system 208 partitions a collection of documents into individual shards, which may be searched separately in an effort to more efficiently execute a search query in accordance with one or more embodiments.

Figure 5:
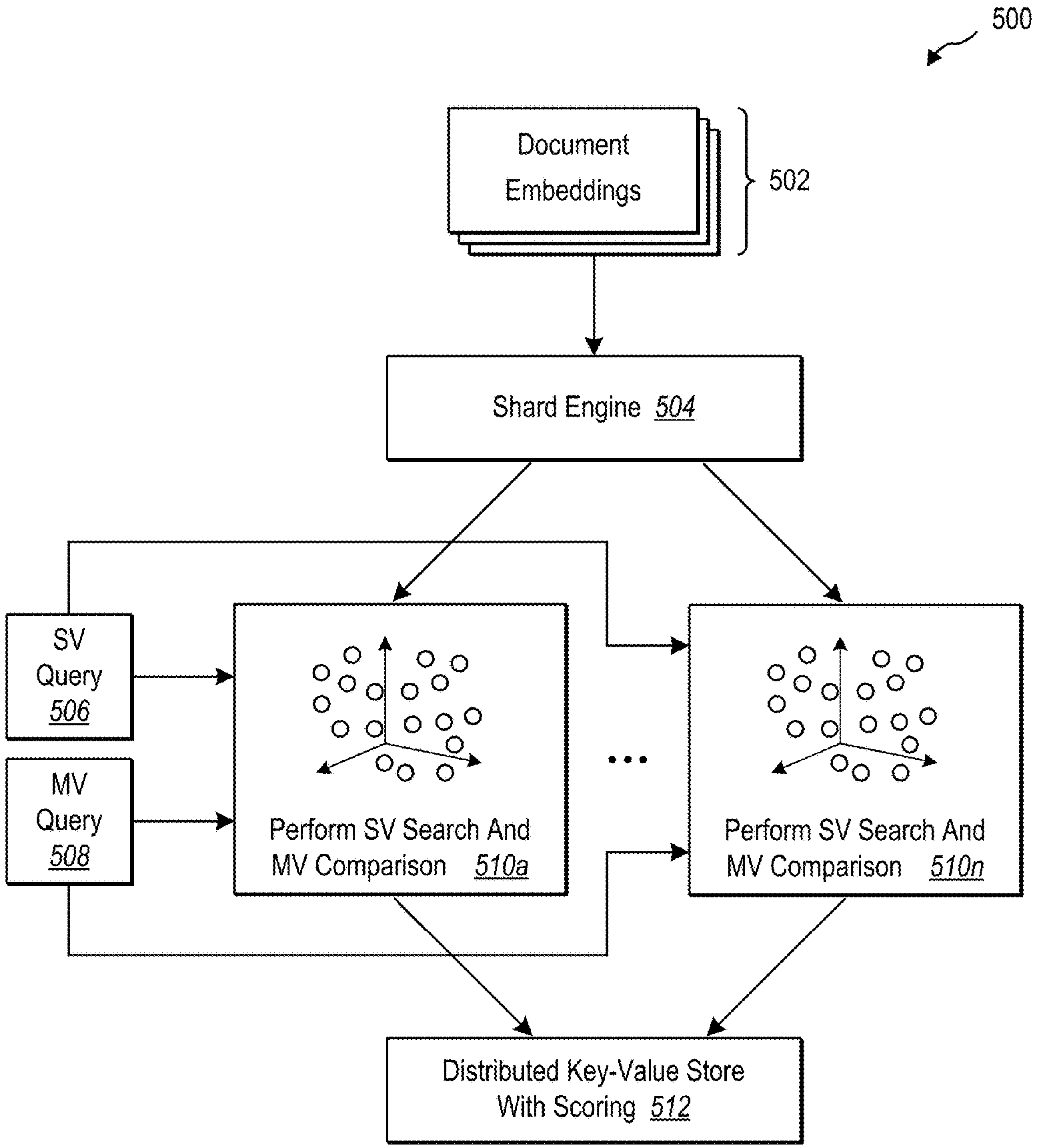
FIG. 5 illustrates an example workflow in which a document graph index is partitioned into shard to efficiently search a plurality of documents in accordance with one or more embodiments.

As shown in FIG. 5, the single and multi-vector search system 208 may receive a plurality of document embeddings 502. These document embeddings 502 may include both the single-vector embeddings and the multi-vector embeddings representing of a collection of documents as discussed above in connection with various examples. In one or more embodiments, the document embeddings 502 are represented within a graph index, as discussed above.

As shown in FIG. 5, the single and multi-vector search system 208 may make use of a shard engine 504 that sub-divides the document embeddings into shards, resulting in discrete sub-sets of embeddings that are collectively representative of the full collection of documents. As shown in FIG. 5, the shard engine 504 may generate a plurality of shards 510*a-n*, each including a discrete portion of the document graph index. In one or more embodiments, these document graph indices are non-overlapping, in that each of them represents different subsets of the collection of document with little if any overlap in documents represented therein.

As shown in FIG. 5, the single and multi-vector search system 208 may perform a single-vector query 506 on the singe-vector embeddings. More specifically, the single and multi-vector search system 208 may execute the single-vector query independently on each of the shards 510*a-n* to identify discrete subsets of each shard. The single and multi-vector search system 208 may perform the single-vector query in a similar fashion as the above-described single-vector searches on the single-vector embeddings representative of the collection of documents. Each of these discrete subsets represent candidate documents, collectively making up a set of candidate documents similar to other example implementations described herein.

As further shown, the single and multi-vector search system 208 may perform a multi-vector query 508 on each of the shards 510*a-n*. More specifically, using any of the multi-vector comparison techniques described herein, the single and multi-vector search system 208 may determine metrics of similarity for each of the candidate documents based on a comparison of a multi-vector query embedding with each of the multi-vector embeddings associated with the subset of single-vector embeddings identified through the single-vector search. This multi-vector comparison may be performed in a similar manner as other examples discussed above.

As shown in FIG. 5, upon performing both the single-vector search and multi-vector comparison, the single and multi-vector search system 208 may generate a result set. In this example, the result set may include a distributed key-value store with scoring 512. In one or more embodiments, this involves generating a result set including a re-ranking or more narrow identification of documents that are determined to be most similar or responsive to the received search query based on the similarity metric(s) determined from the multi-vector comparison.

While not explicitly shown in FIG. 5, the result set may be used in a variety of ways. In one or more embodiments, the single and multi-vector search system 208 facilitates a presentation of the result set in which a listing of documents (e.g., ranked documents) are presented via a graphical user interface of a client device. This can be presented via an application associated with generating the search query (e.g., a searching application, or web browser). In one or more embodiments, the result set may be used by an application in performing one or more additional tasks. For instance, the single and multi-vector search system 208 may provide the result set including the identified documents (or simply a listing or identification of the identified documents), and allow the application to use the documents in a number of ways as may serve any particular embodiment. In one or more embodiments, the result set can simply be a listing of search results including links to various documents, such as a listing of search results responsive to an Internet search query.

Figure 6:
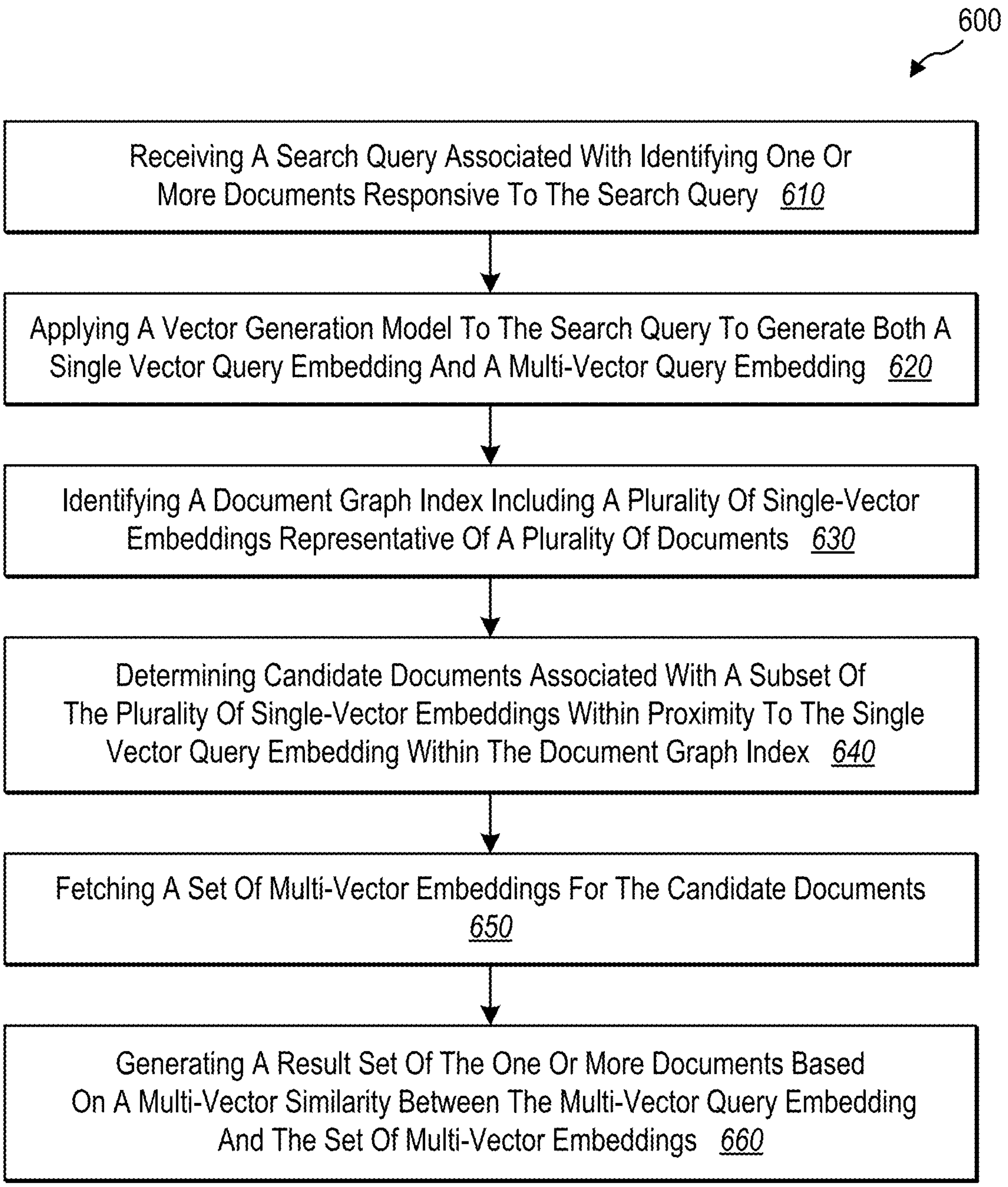
FIG. 6 illustrates an example series of acts for utilizing single and muti-vector embeddings to generate a result set responsive to a search query in accordance with one or more embodiments.

Turning now to FIG. 6, this figure illustrates an example series of acts for sequentially performing single-vector searches and multi-vector comparisons using single and multi-vector embeddings to determine a result set including an identified set of documents from a large corpus of documents that is responsive to a search query. While FIG. 6 illustrates acts according to one or more embodiments, alternative embodiments may omit, add to reorder, and/or modify any of the acts shown in FIG. 6. The acts of FIG. 6 may be performed as part of a method. Alternatively, a non-transitory computer-readable medium can include instructions thereon that, when executed by one or more processors, cause a server device and/or client device to perform the acts of FIG. 6. In still further embodiments, a system can perform the acts of FIG. 6.

As shown in FIG. 6, the series of acts 600 includes an act 610 of receiving a search query associated with identifying one or more documents responsive to the search query. In one or more embodiments, the act 610 involves receiving a search query associated with identifying one or more documents from the plurality of documents.

As further shown in FIG. 6, the series of acts 600 includes an act 620 of applying a vector generation model to the search query to generate both a single vector query embedding and a multi-vector query embedding. In one or more embodiments, the act 620 involves applying a vector generation model to the received search query to generate both a single vector query embedding and a multi-vector query embedding representative of the search query.

As further shown in FIG. 6, the series of acts 600 includes an act 630 of identifying a document graph index including a plurality of single-vector embeddings representative of a plurality of documents. In one or more embodiments, the act 630 involves identifying a document graph index including values of a plurality of single-vector embeddings representative of a plurality of documents, the values of the single-vector embeddings being mapped to associated locations in an n-dimensional space.

As further shown in FIG. 6, the series of acts 600 includes an act 640 of determining candidate documents associated with a subset of the plurality of single-vector embeddings within proximity to the single vector query embedding within the document graph index. In one or more embodiments, the act 640 involves determining a set of candidate documents from the plurality of documents, the set of candidate documents being associated with a subset of single-vector embeddings from the plurality of single-vector embeddings based on the subset of single-vector embeddings having a proximity to the single vector query embedding when mapped to a location in the n-dimensional space. In one or more embodiments, determining the set of candidate documents comprises performing a nearest neighbor search on the document graph index against the location of the single-vector query embedding within the n-dimensional space.

As further shown in FIG. 6, the series of acts 600 includes an act 650 of fetching a set of multi-vector embeddings for the candidate documents. In one or more embodiments, the act 650 involves fetching a set of multi-vector embeddings associated with the set of candidate documents.

As further shown in FIG. 6, the series of acts 600 includes an act 660 of generating a result set of the one or more documents based on a multi-vector similarity between the multi-vector query embedding and the set of multi-vector embeddings. In one or more embodiments, the act 660 involves generating a result set of the one or more documents from the plurality of documents based on a multi-vector similarity between the multi-vector query embedding and the set of multi-vector embeddings associated with the set of candidate documents.

In one or more embodiments, the search query is a user-generated search query received from a computing device associated with a user. In one or more embodiments, the search query is an output of a generative artificial intelligence (AI) model requesting the one or more documents from the plurality of documents based on an input prompt.

In one or more embodiments, the series of acts 600 includes an act of determining the multi-vector similarity between the multi-vector query embedding and the set of multi-vector embeddings based on a determined similarity between a combination of values of the multi-vector query embedding and combinations of values of the set of multi-vector embeddings associated with the set of candidate documents.

In one or more embodiments, the vector generation model is a same vector generation model used in generating the plurality of single-vector embeddings and an associated plurality of multi-vector embeddings representative of the plurality of documents. In one or more embodiments, the plurality of single vector embeddings and the plurality of multi-vector embeddings are jointly inferenced from the plurality of documents using the vector generation model.

In one or more embodiments, generating both the single vector query embedding and the multi-vector query embedding includes generating a plurality of tokens associated with characteristics of the search query, determining values of the single vector query embedding based on one or more combinations of the plurality of tokens, and using individual tokens of the plurality of tokens in determining the values of the multi-vector query embedding.

In one or more embodiments, the series of acts 600 includes partitioning the document graph index into a plurality of shards. In this example, determining the set of candidate documents may include performing a proximity search on each shard of the plurality of shards to identify candidate embeddings identified within respective shards of the plurality of shards. In one or more embodiments, the series of acts 600 includes performing a plurality of proximity searches on the plurality of shards to simultaneously identify candidate documents represented by single-vector embeddings within the plurality of shards.

In one or more embodiments, the set of candidate documents includes a subset of less than one percent of documents from the plurality of documents. In one or more embodiments, fetching the set of multi-vector embeddings includes accessing multi-vector embeddings from a secondary storage on which a plurality of multi-vector embeddings representative of the plurality of documents is maintained. In one or more embodiments, determining the set of candidate documents includes identifying document identifiers associated with the subset of single-vector embeddings. In this example, fetching the set of multi-vector embeddings includes fetching multi-vector entries from a key-value store of multi-vector embeddings associated with the document identifiers.

In one or more embodiments, generating the result set includes identifying and returning a subset of the set of candidate documents based on the multi-vector similarity. In one or more embodiments, generating the result set includes determining and returning a re-ranked set of candidate documents based on the multi-vector similarity between the multi-vector query embedding and the set of multi-vector embeddings.

Figure 7:
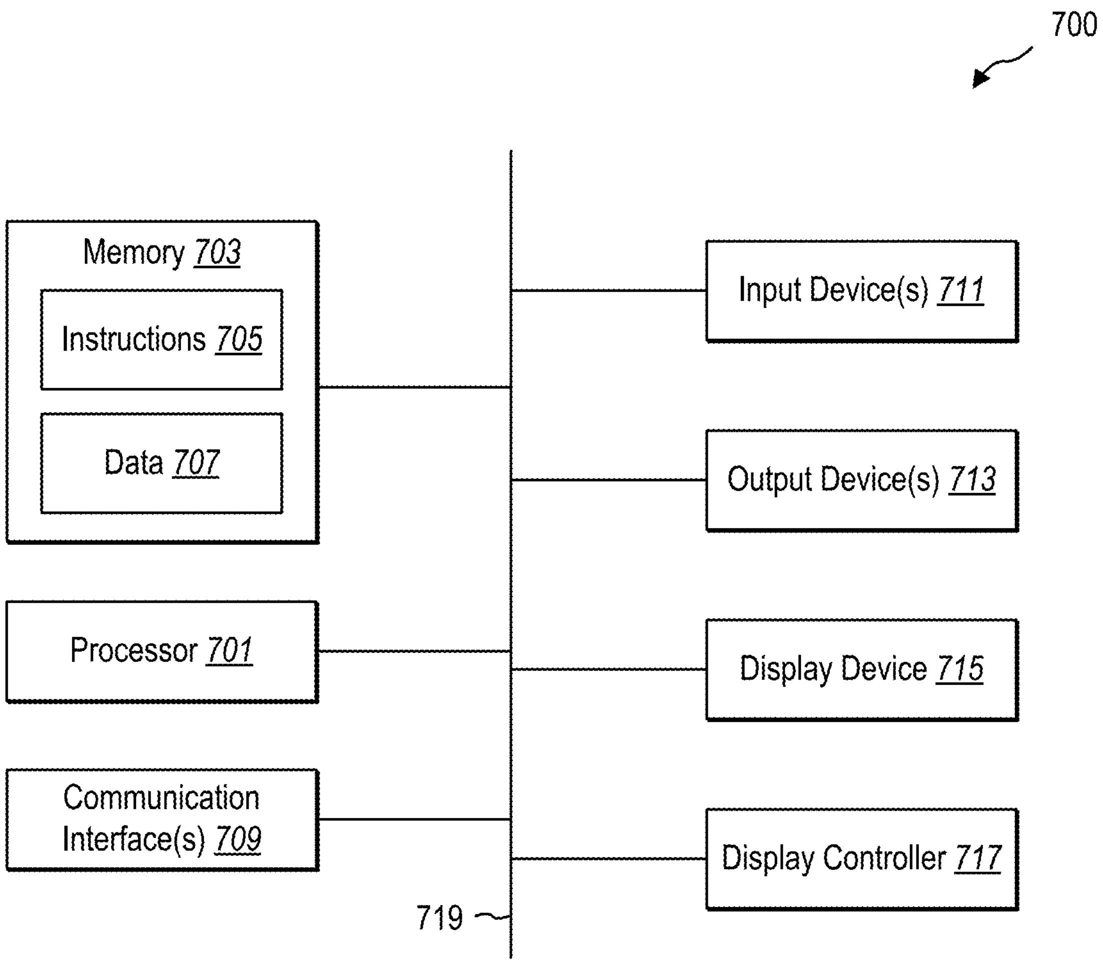
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for using single and multi-vector query embeddings to perform a search of a plurality of documents, the method comprising:
- receiving a search query associated with identifying one or more documents from the plurality of documents;
- applying a vector generation model to the received search query to generate both a single vector query embedding and a multi-vector query embedding representative of the search query;
- identifying a document graph index including values of a plurality of single-vector embeddings representative of a plurality of documents, the values of the single-vector embeddings being mapped to associated locations in an n-dimensional space;
- determining a set of candidate documents from the plurality of documents, the set of candidate documents being associated with a subset of single-vector embeddings from the plurality of single-vector embeddings based on the subset of single-vector embeddings having a proximity to the single vector query embedding when mapped to a location in the n-dimensional space;
- fetching a set of multi-vector embeddings associated with the set of candidate documents; and
- generating a result set of the one or more documents from the plurality of documents based on a multi-vector similarity between the multi-vector query embedding and the set of multi-vector embeddings associated with the set of candidate documents.

2. The method of claim 1, wherein the search query is a user-generated search query received from a computing device associated with a user.

3. The method of claim 1, wherein the search query is an output of a generative artificial intelligence (AI) model requesting the one or more documents from the plurality of documents based on an input prompt.

4. The method of claim 1, wherein determining the set of candidate documents comprises performing a nearest neighbor search on the document graph index against the location of the single-vector query embedding within the n-dimensional space.

5. The method of claim 1, further comprising determining the multi-vector similarity between the multi-vector query embedding and the set of multi-vector embeddings based on a determined similarity between a combination of values of the multi-vector query embedding and combinations of values of the set of multi-vector embeddings associated with the set of candidate documents.

6. The method of claim 1, wherein the vector generation model is a same vector generation model used in generating the plurality of single-vector embeddings and an associated plurality of multi-vector embeddings representative of the plurality of documents.

7. The method of claim 6, wherein the plurality of single vector embeddings and the plurality of multi-vector embeddings are jointly inferenced from the plurality of documents using the vector generation model.

8. The method of claim 1, wherein generating both the single vector query embedding and the multi-vector query embedding comprises:
- generating a plurality of tokens associated with characteristics of the search query;
- determining values of the single vector query embedding based on one or more combinations of the plurality of tokens; and
- using individual tokens of the plurality of tokens in determining the values of the multi-vector query embedding.

9. The method of claim 1, further comprising partitioning the document graph index into a plurality of shards, wherein determining the set of candidate documents includes performing a proximity search on each shard of the plurality of shards to identify candidate embeddings identified within respective shards of the plurality of shards.

10. The method of claim 9, further comprising performing a plurality of proximity searches on the plurality of shards to simultaneously identify candidate documents represented by single-vector embeddings within the plurality of shards.

11. The method of claim 1, wherein the set of candidate documents comprises a subset of less than one percent of documents from the plurality of documents.

12. The method of claim 1, wherein fetching the set of multi-vector embeddings comprises accessing multi-vector embeddings from a secondary storage on which a plurality of multi-vector embeddings representative of the plurality of documents is maintained.

13. The method of claim 1, wherein determining the set of candidate documents includes identifying document identifiers associated with the subset of single-vector embeddings, wherein fetching the set of multi-vector embeddings comprises fetching multi-vector entries from a key-value store of multi-vector embeddings associated with the document identifiers.

14. The method of claim 1, wherein generating the result set includes one or more of:
- identifying and returning a subset of the set of candidate documents based on the multi-vector similarity; or
- determining and returning a re-ranked set of candidate documents based on the multi-vector similarity between the multi-vector query embedding and the set of multi-vector embeddings.

15. A system for using single and multi-vector query embeddings to perform a search of a plurality of documents, the system comprising:

at least one processor;

a memory in electronic communication with the at least one processor; and instructions stored in the memory, the instructions being executable by the at least one processor to:

receive a search query associated with identifying one or more documents from the plurality of documents;

apply a vector generation model to the received search query to generate both a single vector query embedding and a multi-vector query embedding representative of the search query;

identify a document graph index including values of a plurality of single-vector embeddings representative of a plurality of documents, the values of the single-vector embeddings being mapped to associated locations in an n-dimensional space;

determine a set of candidate documents from the plurality of documents, the set of candidate documents being associated with a subset of single-vector embeddings from the plurality of single-vector embeddings based on the subset of single-vector embeddings having a proximity to the single vector query embedding when mapped to a location in the n-dimensional space;

fetch a set of multi-vector embeddings associated with the set of candidate documents; and generate a result set of the one or more documents from the plurality of documents based on a multi-vector similarity between the multi-vector query embedding and the set of multi-vector embeddings associated with the set of candidate documents.

16. The system of claim 15, wherein determining the set of candidate documents comprises performing a nearest neighbor search on the document graph index against the location of the single-vector query embedding within the n-dimensional space.

17. The system of claim 15, wherein the vector generation model is a same vector generation model used in generating the plurality of single-vector embeddings and an associated plurality of multi-vector embeddings representative of the plurality of documents, and wherein the plurality of single vector embeddings and the plurality of multi-vector embeddings are jointly inferenced from the plurality of documents using the vector generation model.

18. The system of claim 15, further comprising instructions being executable by the at least one processor to partition the document graph index into a plurality of shards, wherein determining the set of candidate documents includes performing a proximity search on each shard of the plurality of shards to identify candidate embeddings identified within respective shards of the plurality of shards.

19. The system of claim 15, wherein generating both the single vector query embedding and the multi-vector query embedding comprises:

generating a plurality of tokens associated with characteristics of the search query;

determining values of the single vector query embedding based on one or more combinations of the plurality of tokens; and using individual tokens of the plurality of tokens in determining the values of the multi-vector query embedding.

20. A non-transitory computer readable medium storing instructions thereon that, when executed by at least one processor, causes one or more computing devices to:

receive a search query associated with identifying one or more documents from a plurality of documents;

apply a vector generation model to the received search query to generate both a single vector query embedding and a multi-vector query embedding representative of the search query;

identify a document graph index including values of a plurality of single-vector embeddings representative of a plurality of documents, the values of the single-vector embeddings being mapped to associated locations in an n-dimensional space;

determine a set of candidate documents from the plurality of documents, the set of candidate documents being associated with a subset of single-vector embeddings from the plurality of single-vector embeddings based on the subset of single-vector embeddings having a proximity to the single vector query embedding when mapped to a location in the n-dimensional space;

fetch a set of multi-vector embeddings associated with the set of candidate documents; and generate a result set of the one or more documents from the plurality of documents based on a multi-vector similarity between the multi-vector query embedding and the set of multi-vector embeddings associated with the set of candidate documents.

* * * * *